(12) United States Patent
Shibano (10) Patent No.: US 8,749,844 B2
(45) Date of Patent: Jun. 10, 2014

(54) APPARATUS CONTROL METHOD AND CONTROL APPARATUS

(75) Inventor: Hiromasa Shibano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 77 days.

(21) Appl. No.: 13/469,480

(22) Filed: May 11, 2012

(65) Prior Publication Data

US 2013/0016372 A1 Jan. 17, 2013

(30) Foreign Application Priority Data

Jul. 14, 2011 (JP) .................................. 2011-155750

(51) Int. Cl.
*G06F 3/12* (2006.01)
*G06F 15/00* (2006.01)

(52) U.S. Cl.
USPC ............................ 358/1.9; 358/3.28; 713/176

(58) Field of Classification Search
USPC ........ 358/1.9, 1.15, 3.28, 448, 450, 452, 462; 382/100, 181, 185; 713/176; 283/113
See application file for complete search history.

(56) References Cited

U.S. PATENT DOCUMENTS

| | | | |
|---|---|---|---|
| 2004/0085570 A1* | 5/2004 | Sfaelos et al. ................ | 358/1.15 |
| 2005/0050331 A1* | 3/2005 | Skurdal et al. ................ | 713/176 |
| 2006/0072782 A1* | 4/2006 | Abe et al. ....................... | 382/100 |
| 2006/0215211 A1* | 9/2006 | Kato et al. ..................... | 358/1.14 |
| 2008/0233980 A1* | 9/2008 | Englund et al. ............... | 382/182 |
| 2009/0171653 A1* | 7/2009 | Hecht et al. .................... | 382/232 |
| 2011/0279838 A1* | 11/2011 | Uchida et al. .................. | 358/1.9 |
| 2012/0116750 A1* | 5/2012 | Onishi .............................. | 704/3 |
| 2012/0163668 A1* | 6/2012 | Englund et al. ............... | 382/103 |
| 2012/0176651 A1* | 7/2012 | Pham et al. ................... | 358/3.28 |
| 2012/0293605 A1* | 11/2012 | Seferian et al. ............ | 348/14.08 |

FOREIGN PATENT DOCUMENTS

| | | |
|---|---|---|
| JP | 11-250066 | 9/1999 |
| JP | 2000-231306 | 8/2000 |
| JP | 2006-276904 | 10/2006 |
| JP | 2006-279098 | 10/2006 |
| JP | 2007-265054 | 10/2007 |
| JP | 2008-153912 | 7/2008 |

* cited by examiner

Primary Examiner — Kimberly A Williams
(74) Attorney, Agent, or Firm — Edwards Wildman Palmer LLP; David G. Conlin; Steven M. Jensen (57) ABSTRACT

A user is able to appropriately select character data such as a watermark, and importance of the document is able to be effectively recognized by an addressee using a language which is different from that of a user who sends the document. A setting accepting portion accepts setting of a first language describing a first character indicated by the first character data, and setting of a second character which is a translation of the first character to a second language; a data generating portion generates a composite image data in which the image data is combined with the first character data indicating a first character which is a translation of the second character to the first language; and an apparatus control portion controls the image forming apparatus to cause the image forming apparatus to execute image forming processing of the composite image data.

5 Claims, 13 Drawing Sheets

APPARATUS CONTROL METHOD AND CONTROL APPARATUS

CROSS-NOTING PARAGRAPH

This non-provisional application claims priority under 35 U.S.C. §119 (a) on Patent Application No. 2011-155750 filed in JAPAN on Jul. 14, 2011, the entire contents of which are hereby incorporated herein by reference.

FIELD OF THE INVENTION

The present invention relates to an apparatus control method and a control apparatus for controlling an image forming apparatus which generates composite image data in which image data is combined with character data and performs image formation of the composite image data.

BACKGROUND OF THE INVENTION

When printing a document, conventionally, a watermark has been used to show importance of the document. The watermark is a character printed on a document such as "至急 (URGENT)", "マル秘 (CONFIDENTIAL)", "重要 (IMPORTANT)", and "極秘 (TOP SECRET)". A function to print such watermarks on documents is included in a printer driver as standard specifications. Further, it is possible to print arbitrary characters input by a user on a document as a watermark.

However, in such a case, a language of a watermark which can be used by the user is the language that has been selected by the user as a using language when installing a printer driver in a computer. For example, when the user selects Japanese at the time of installing the printer driver, the language of the watermark to be printed on a document will be Japanese.

Then, when a document on which a watermark in Japanese is printed is sent by FAX, mail, an electronic mail, etc. to a dealer or a production factory in a country in which English, Korean or Portuguese is spoken, a local staff member who is the addressee of the document cannot recognize the importance of the watermark, and the case where the watermark does not function as intended may thus occur.

As the result, the document on which the watermark, "至急 (URGENT)" is printed may be delayed to be received by a person in change, handling of the document may be left until later, or the document on which the watermark, "極秘 (TOP SECRET)" is printed may be left on a desk, thus causing a trouble in business.

It might be helpful if a user can directly input characters used as a watermark in the language that can be understood by the local staff member, however, it is expected that there is a small number of users who know the expressions in Korean, Portuguese, etc.

Furthermore, even when expressions in those languages are known by a user, when the OS (operating system) of a computer is provided in a Japanese version, or when a keyboard is a Japanese keyboard, there occurs a problem that the OS needs to be set up so that characters in such a language can be input, input of Hangul characters or characters with accent marks is difficult, and the like.

Japanese Laid-Open Patent Publication No. 2006-279098 shows a translation apparatus which, in order to transmit to a user who cannot understand Japanese at all that a document should be dealt as a secret, extracts from data security information which is an image indicating that the document should be dealt as a secret, and translates the security information into a target language.

However, the translation apparatus of Japanese Laid-Open Patent Publication No. 2006-279098 is used in a case where the security information has already been printed on a document, and not used prior to the printing of the document. Therefore, the type of the security information to be printed on a document cannot be selected by a user.

That is to say, the translation apparatus of Japanese Laid-Open Patent Publication No. 2006-279098 is not the apparatus in which in order to solve the problem due to a language used in a destination country, when a user has decided a watermark to be added to the document while the document to which the watermark is added has not yet been printed, appropriate processing is performed for the document, and has a background art and a purpose of development which are totally different from such an apparatus.

SUMMARY OF THE INVENTION

An object of the present invention is to provide an apparatus control method and a control apparatus in which a user is able to select character data such as a watermark to be combined with a document appropriately before performing image formation, and importance of the document is able to be effectively recognized by an addressee using a language which is different from that of a user who sends the document.

An object of the present invention is to provide an apparatus control method for controlling an image forming apparatus which generates a composite image data in which image data is combined with first character data and performs image formation of the composite image data, comprising: a setting receiving step of accepting from a user setting of a first language describing a first character indicated by the first character data, and setting of a second character which is a translation of the first character to a second language; a data reading step of reading from a storage portion the first character data indicating a first character which is a translation of the second character to the first language; a data generating step of generating composite image data in which the image data is combined with the first character data; and a control step of transmitting the composite image data to the image forming apparatus and controlling the image forming apparatus to execute image forming processing of the composite image data.

Another object of the present invention is to provide the apparatus control method, generating, at the data generating step, a composite image data which further combines, in addition to the first character data, second character data indicating the second character with the image data.

Another object of the present invention is to provide the apparatus control method, generating, at the data generating step, the composite image data in which a size of the first character is displayed larger than a size of the second character.

Another object of the present invention is to provide the apparatus control method, further comprising a display step of displaying on a display portion a preview of the composite image data generated at the data generating step.

Another object of the present invention is to provide the apparatus control method, wherein, the first language is set based on language information indicating a correspondence relation between the destination country and a language used in the destination country when accepting from a user specification of a destination country of a composite image formed by the image forming processing of the composite image data, and the setting of the first language is accepted through the specification of the destination country at the setting acceptance step.

Another object of the present invention is to provide a control apparatus for controlling an image forming apparatus which generates a composite image data in which image data is combined with first character data and performs image formation of the composite image data, comprising: a storage portion for storing the first character data; a setting accepting portion for accepting from a user setting of a first language describing a first character indicated by the first character data, and setting of a second character which is a translation of the first character into a second language; a data generating portion for reading from the storage portion the first character data indicating a first character which is a translation of the second character to the first language, and generating composite image data in which the image data is combined with the first character data; and an apparatus control portion for transmitting the composite image data to the image forming apparatus and controlling the image forming apparatus to execute image forming processing of the composite image data.

PREFERRED EMBODIMENTS OF THE INVENTION

Figure 1:
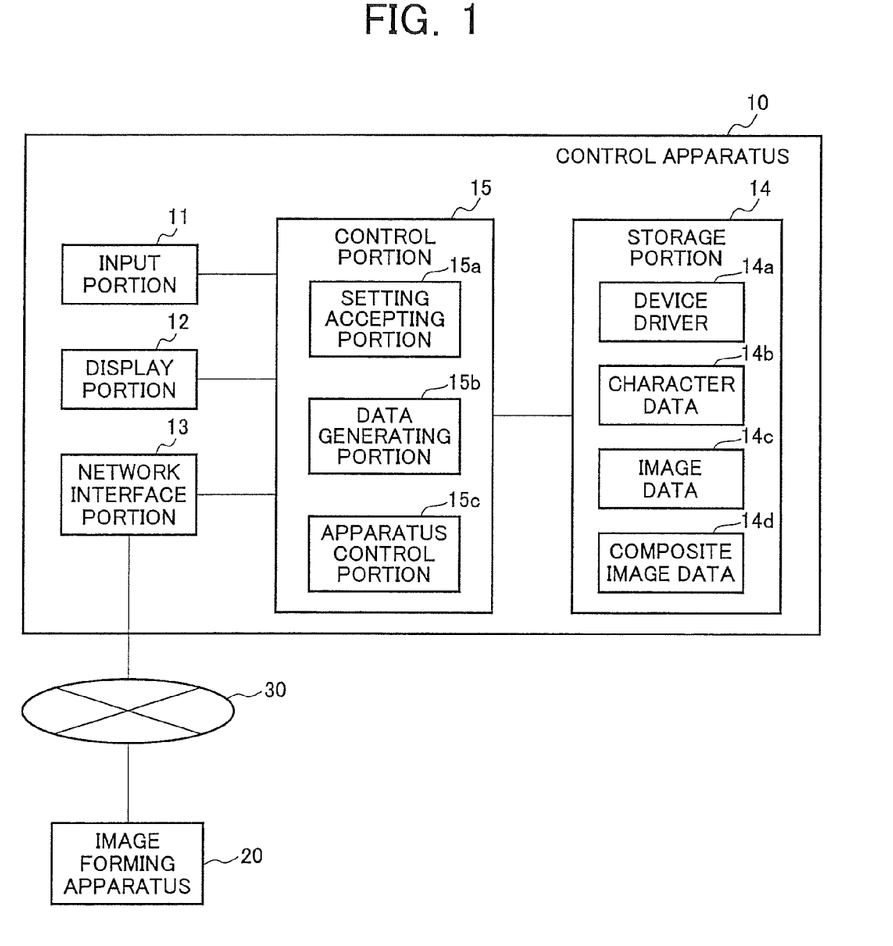
FIG. 1 is a diagram showing an example of a control device according to an embodiment of the present invention.

Hereinafter, description will be given in detail for preferred embodiments of the present invention with reference to accompanying drawings. FIG. 1 is a diagram showing an example of a control apparatus 10 according to an embodiment of the present invention. This control apparatus 10 is an apparatus such as a personal computer that is connected to an image forming apparatus 20 performing image forming processing such as printing via a network 30, and causes the image forming apparatus 20 to execute the image forming processing. The control apparatus 10 includes an input portion 11, a display portion 12, a network interface portion 13, a storage portion 14 and a control portion 15.

The input portion 11 is an input device such as a keyboard or a mouse. The display portion 12 is a display device such as a liquid crystal display. The interface portion 13 is a processing portion to communicate with another apparatus such as the image forming apparatus 20 via the network 30.

The storage portion 14 is a storage device such as a memory or a hard disk drive. The storage portion 14 stores various data such as a device driver 14a, character data 14b, image data 14c and composite image data 14d.

The device driver 14a is an apparatus control program for controlling the image forming apparatus 20. The device driver 14a is read by the control portion 15 which is described below and executed by the control portion 15 to realize functions of a setting acceptance portion 15a, a data generating portion 15b, and an apparatus control portion 15c.

The character data 14b is data of a watermark comprised of various types of characters described in various languages. The watermark is comprised of characters such as, for example, "極秘 (TOP SECRET)", "重要 (IMPORTANT)", "回覧 (CIRCULAR)", "至急 (URGENT)", "大至急 (TOP URGENT)" and "コピー禁止 (COPY PROHIBITED)", printed with images. Further, the languages of the watermarks include, for example, Japanese, English, Korean, Chinese, Portuguese and Vietnamese.

The character data 14b includes first character data described in a first language to be combined with image data, and second character data indicating second characters that is a translation of the first characters indicated by the first character data to a second language. For example, the first language is a language such as English which is used at a destination of a document, while the second language is Japanese as a native language of a sender, and the first character data includes characters such as "TOP SECRET" while the second character data includes characters such as "極秘 (TOP SECRET)".

The image data 14c is image data to be printed. The image data 14c is combined with data of a watermark. The composite image data 14d is image data combined with the data of the watermark.

The control portion 15 is a control device such as a CPU (Central Processing Unit) to control the control apparatus 10 entirely. The control portion 15 is provided with the setting acceptance portion 15a, the data generating portion 15b, and the apparatus control portion 15c.

The setting acceptance portion 15a is a processing portion which displays various setting screens on the display portion 12 and accepts various setting related to control of the image forming apparatus 20 from a user through the input portion 11. The setting acceptance portion 15a, for example, accepts setting of a type of a watermark to be combined with the image data 14c from a user through the input portion 11. Further, in the case of converting the language of the watermark, the setting acceptance portion 15a accepts setting of a language after conversion from the user through the input portion 11.

The data generating portion 15b is a processing portion to generate the composite image data 14d by combining data of a watermark with the image data 14c to be printed. Specifically, the data generating portion 15b reads from the character data 14b the data of the watermark of the types and the language setting of which have been accepted by the setting acceptance portion 15a, and generates composite image data by combining the read data of the watermark with the image data 14c to be printed. The data generating portion 15b then stores the generated composite image data in the storage portion 14 as the composite image data 14d.

The apparatus control portion 15c reads the composite image data 14d generated by the data generating portion 15b from the storage portion 14 and transmits to the image forming apparatus 20. At the same time, the apparatus control portion 15c transmits a control message instructing the image forming apparatus 20 to print the composite image data 14d and causes the image forming apparatus 20 to print the composite image data 14d. The document obtained as the result of the printing is then sent to a dealer, a production factory and the like by, for example, FAX, mail and the like.

Next, description will be given for various setting screens displayed on the display portion 12 when performing setting of apparatus control processing for controlling the image forming apparatus 20.

First, when an application program to perform editing processing or the like of image data accepts an instruction to print the image data 14c from a user, the control portion 15 reads the device driver 14a from the storage portion 14 and activates the device driver 14a. Thereby the functions of the setting acceptance portion 15a, the data generating portion 15b, and the apparatus control portion 15c are realized.

Figure 2:
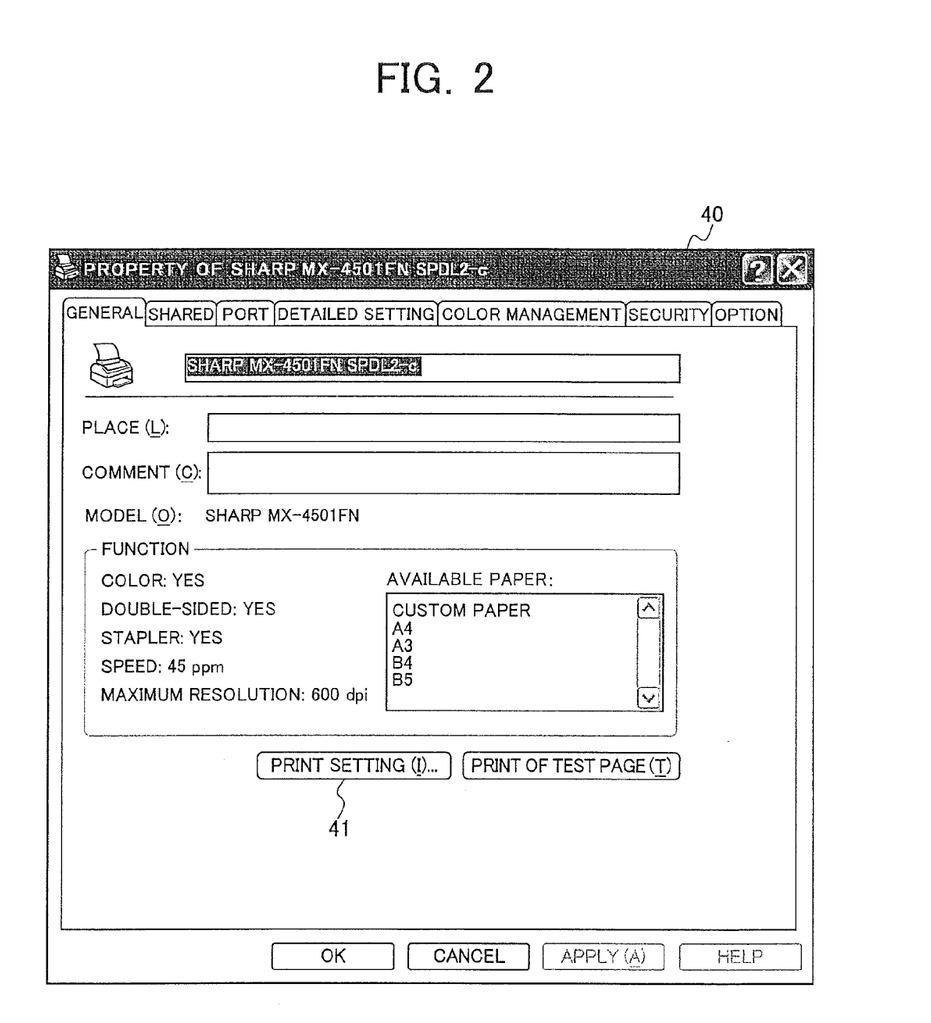
FIG. 2 is a diagram showing an example of a property screen of a device driver.
Figure 3:
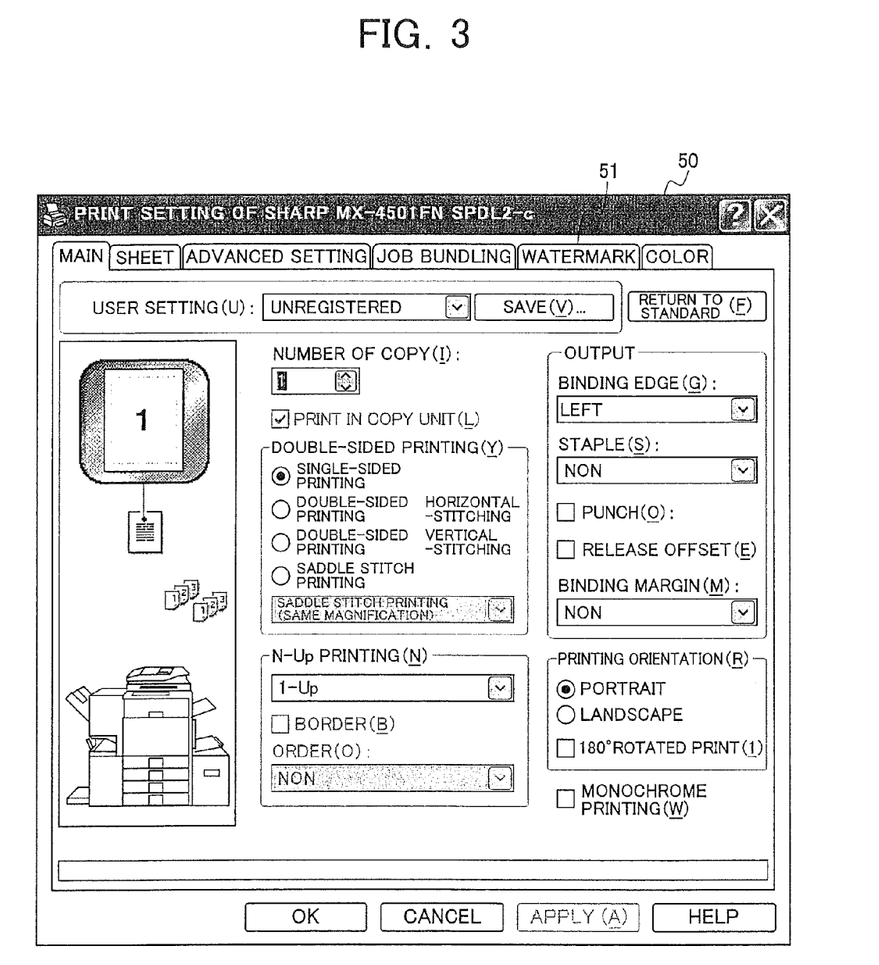
FIG. 3 is a diagram showing an example of a print setting screen of an image forming apparatus.

The setting acceptance portion 15a thereafter displays on the display portion 12 a property screen of the device driver 14a as shown in FIG. 2. FIG. 2 is a diagram showing an example of a property screen 40 of the device driver 14a. When a print setting button 41 on the property screen 40 is clicked by an operation of a mouse or the like by a user, the setting acceptance portion 15a displays a print setting screen 50 shown in FIG. 3. FIG. 3 is a diagram showing an example of a print setting screen 50 of the image forming apparatus 20.

Figure 4:
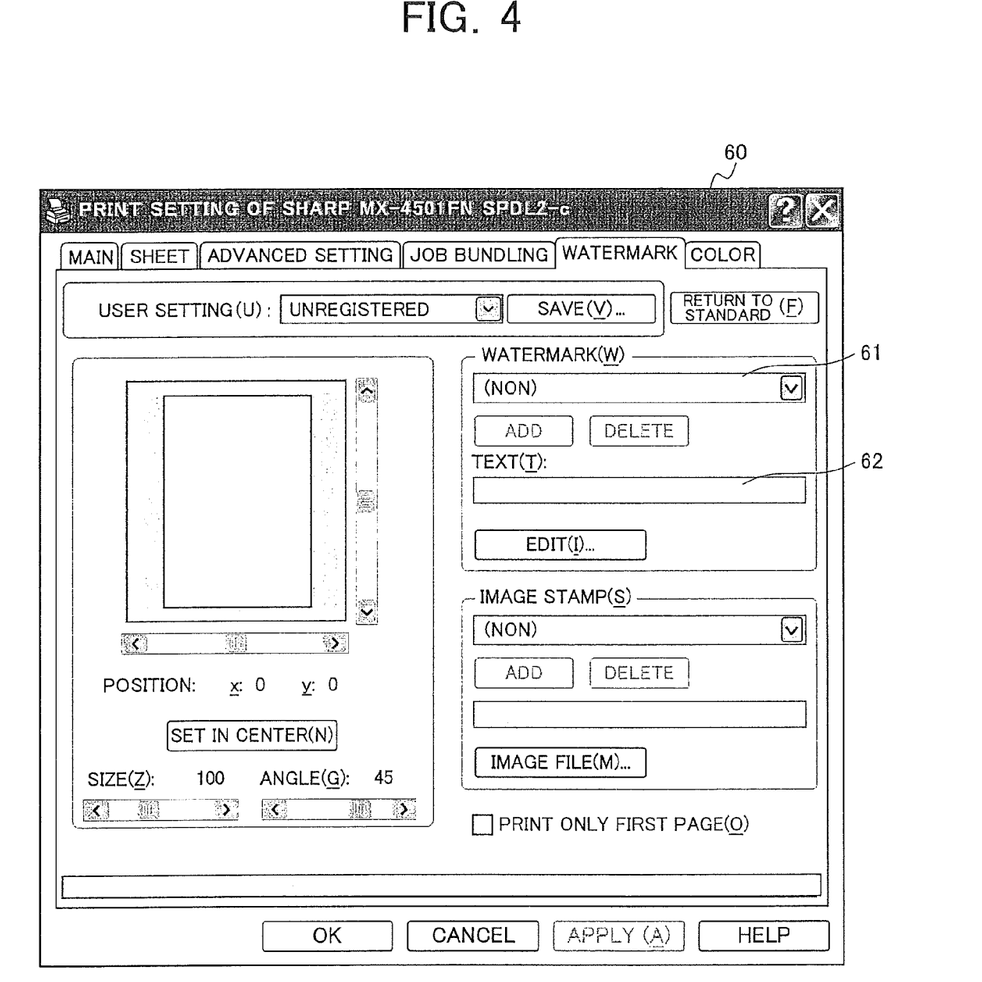
FIG. 4 is a diagram showing an example of a setting screen of a watermark.

Furthermore, when a tab 51 of a watermark on the print setting screen 50 is clicked by an operation of a mouse or the like by a user, the setting acceptance portion 15a displays a setting screen 60 of a watermark as shown in FIG. 4 on the display portion 12. FIG. 4 is a diagram showing an example of the setting screen 60 of a watermark.

Figure 5:
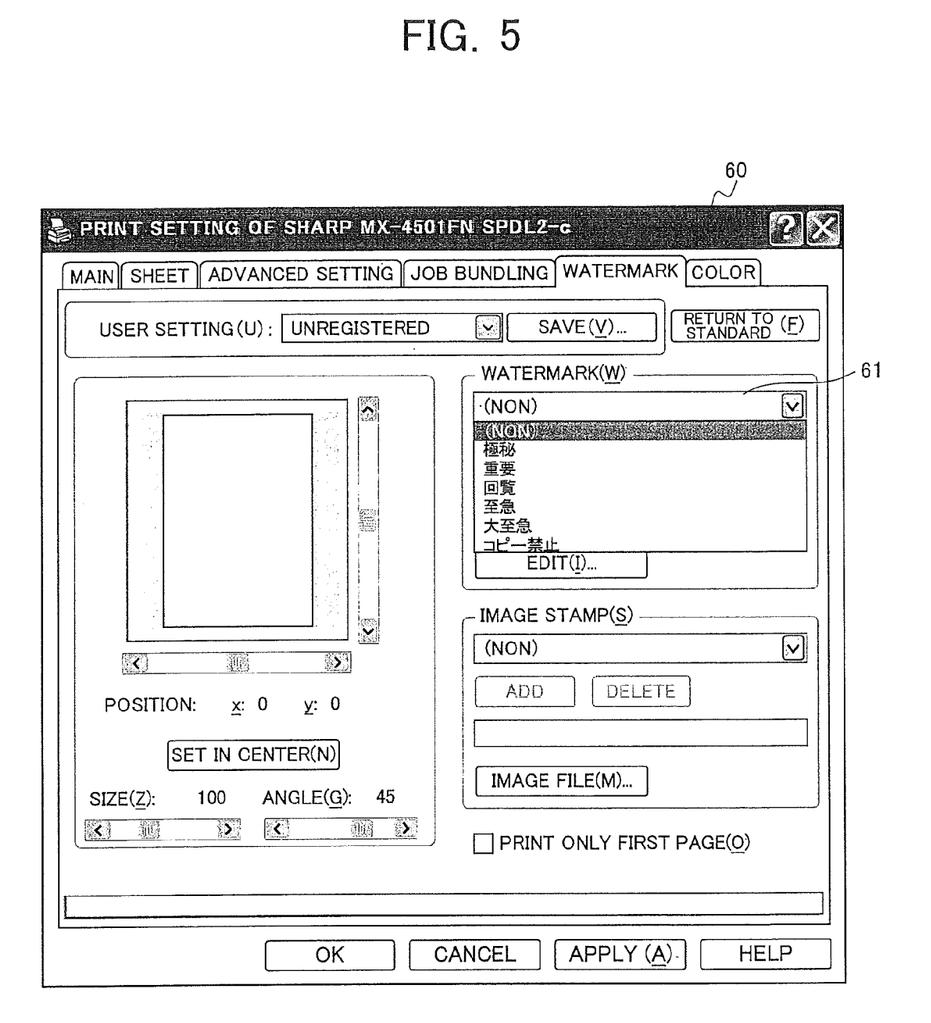
FIG. 5 is a diagram showing an example of an item to be displayed in a case where a pull-down menu is clicked.

The setting acceptance portion 15a accepts a watermark selected by using a pull-down menu 61 by a user on the setting screen 60 as a watermark to be combined with the image data 14c. FIG. 5 is a diagram showing an example of items which are displayed in the case where the pull-down menu 61 is clicked.

In FIG. 5, respective items including "極秘(TOP SECRET)", "重要(IMPORTANT)", "回覧(CIRCULAR)", "至急(URGENT)", "大至急(TOP URGENT)" and "コピー禁止(COPY PROHIBITED)" are displayed. When a user selects any of the items by operating a mouse or the like, the setting acceptance portion 15a accepts the characters selected by the user as a watermark to be combined with the image data 14c. Note that, only the watermarks in Japanese are included in the above-described items, however, watermarks in English may be included.

Further, the user may input characters to be combined with the image data 14c as a watermark in a text input field 62 in FIG. 4 by using a keyboard. In such a case, the setting acceptance portion 15a accepts characters input in the text input field 62 as the watermark to be combined with the image data 14c.

Figure 6:
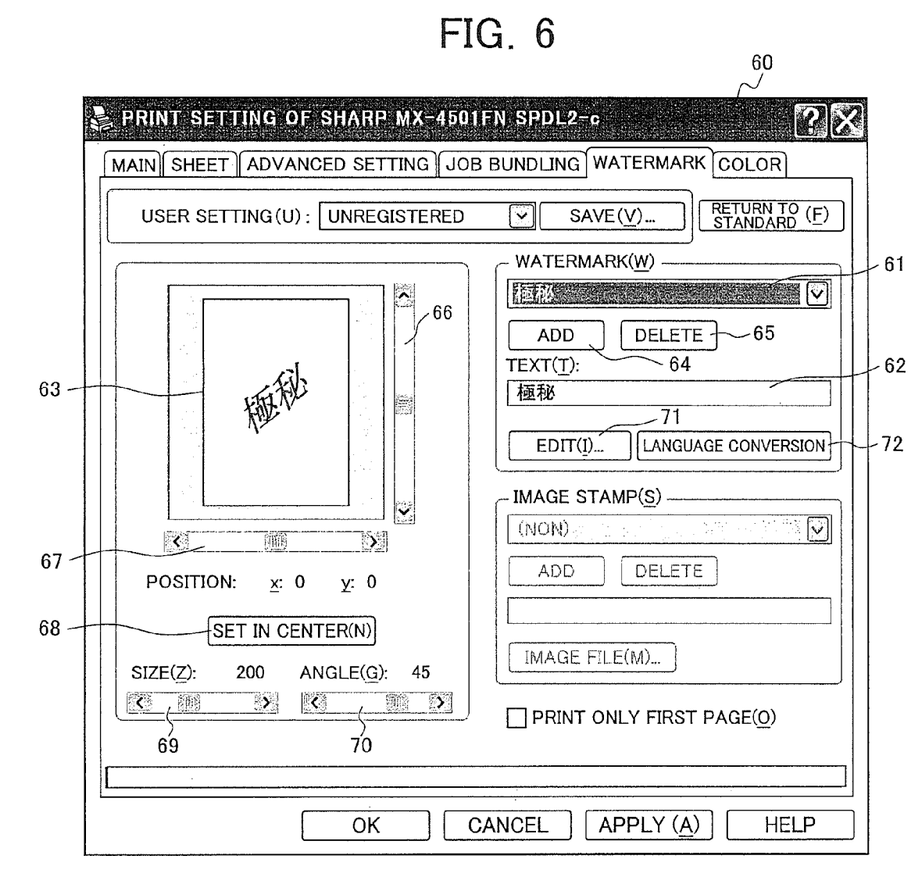
FIG. 6 is a diagram showing an example of a preview screen.

In the case of accepting the specification of the watermark, the setting acceptance portion 15a displays a preview screen 63 as shown in FIG. 6 on the display portion 12. FIG. 6 is a diagram showing an example of the preview screen 63. FIG. 6 shows the preview screen 63 when a watermark of "極秘(TOP SECRET)" is selected in the pull-down menu 61 shown in FIG. 5.

In this case, the setting acceptance portion 15a controls the display portion 12a to display also in the text input field 62 the characters of the watermark of the "極秘(TOP SECRET)" which have been selected in the pull-down menu 61. When a user edits the characters using a keyboard, the setting acceptance portion 15a accepts the edited characters as the watermark set by the user.

Further, when characters are input in the text input field 62 by a user and an add button 64 is further clicked by a mouse or the like, the setting acceptance portion 15a adds characters input in the text input field 62 to the items in the pull-down menu 61.

Additionally, when an item is selected in the pull-down menu 61 and a delete button 65 is further clicked by a mouse or the like by a user, the setting acceptance portion 15a deletes the item selected in the pull-down menu 61 from the items in the pull-down menu 61.

Moreover, when an item is selected in the pull-down menu 61 by the user, or when characters are input in the text input field 62, the setting acceptance portion 15a controls the display portion 12 to display on the preview screen 63 characters of a selected item or input characters.

When the user operates a scroll bar 66 or 67 by a mouse or the like, the setting acceptance portion 15a then changes a display position of the characters in vertical or horizontal directions according to the operation. Further, when the user clicks a set in center key 68 by a mouse or the like, the setting acceptance portion 15a then sets the display position of the characters to be in the center. Further, when the user operates a scroll bar 69 or 70 by a mouse or the like, the setting acceptance portion 15a changes a size and an angle of the characters.

Figure 7:
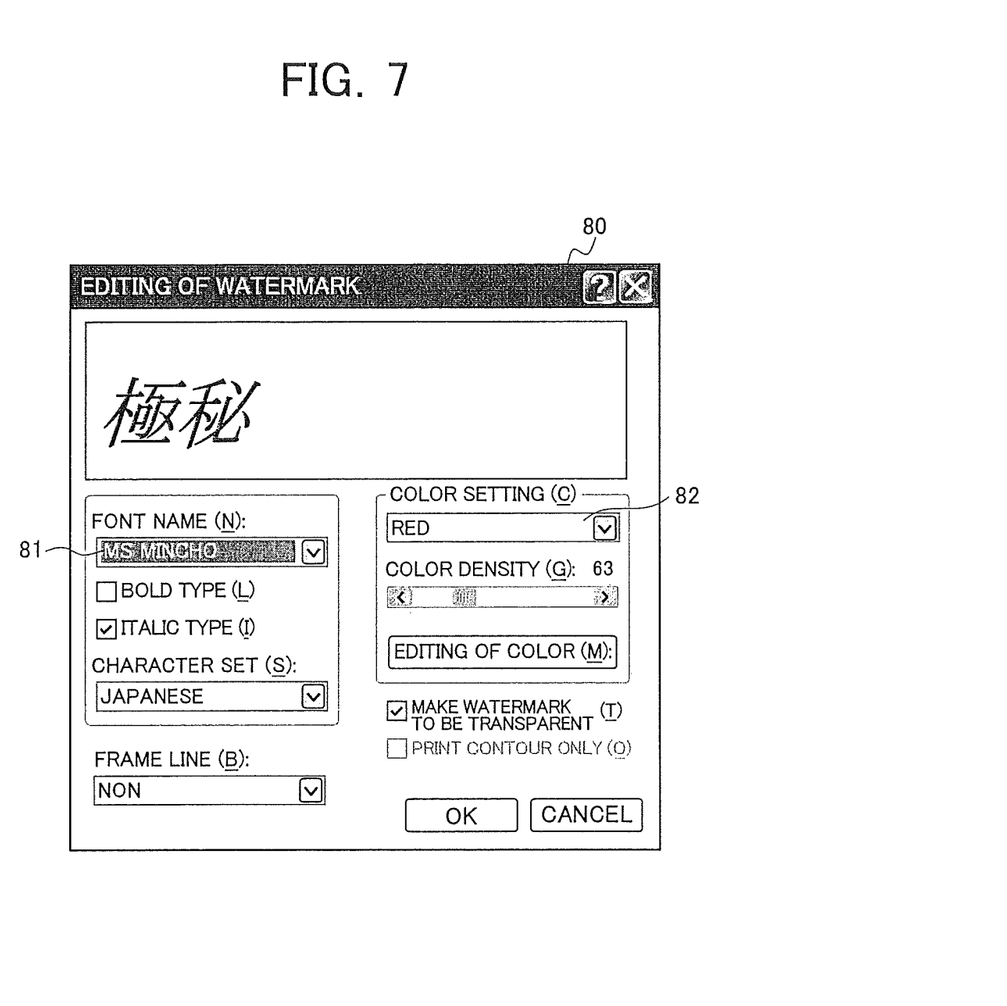
FIG. 7 is a diagram showing an example of an editing screen of characters of a watermark.

When the user clicks an edit button 71 by a mouse or the like, the setting acceptance portion 15a further displays an editing screen of characters of a watermark on the display portion 12. FIG. 7 is a diagram showing an example of an editing screen 80 of characters of a watermark. When the user operates a pull down menu 81 or 82 by a mouse or the like to select a font or color of characters, the setting acceptance portion 15a sets the font or the color of the characters to be those selected.

Figure 8:
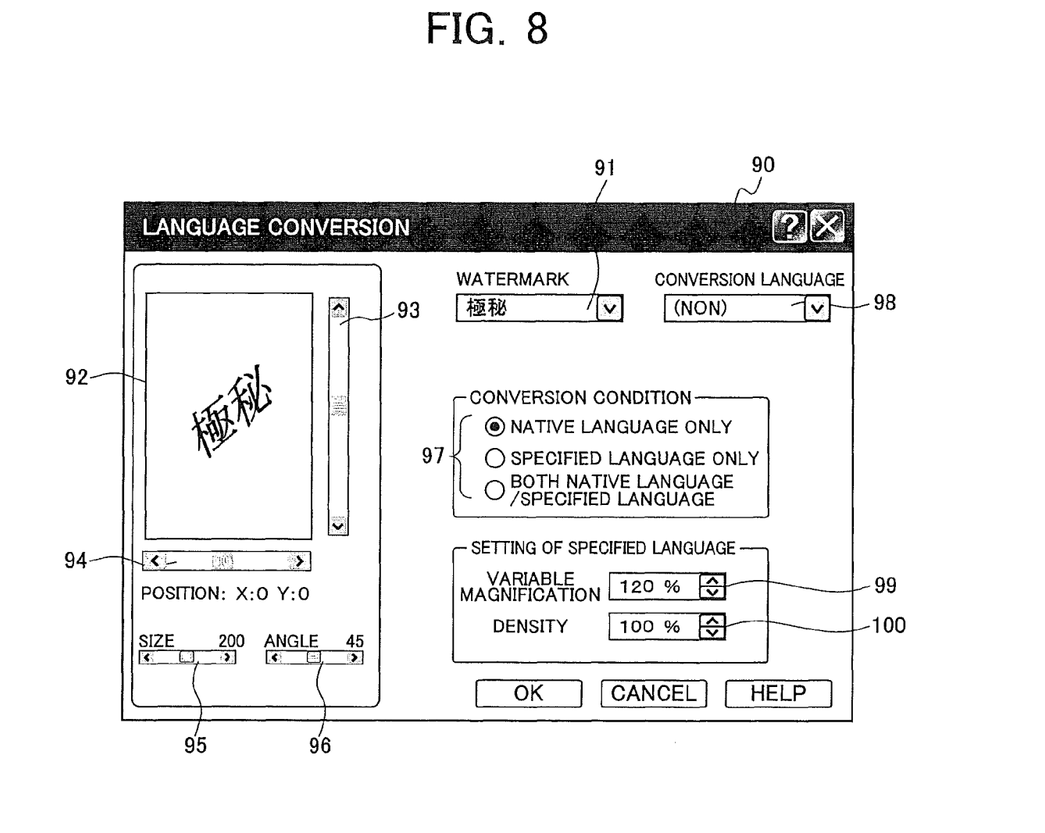
FIG. 8 is a diagram showing an example of a language conversion setting screen.

When the user clicks a language conversion button 72 on the setting screen 60 shown in FIG. 6 by a mouse or the like, the setting acceptance portion 15a further displays a language conversion setting screen 90 as shown in FIG. 8 on the display portion 12. FIG. 8 is a diagram showing an example of the language conversion setting screen 90.

On the language conversion setting screen 90, a state is provided where the watermark ("極秘(TOP SECRET)" in the example of FIG. 8) set on the setting screen 60 shown in FIG. 6 is selected in a pull-down menu 91. When the user selects a watermark using the pull-down menu 91 again, the setting acceptance portion 15a changes the watermark which has been already selected to a newly selected watermark.

Further, the setting acceptance portion 15a controls the display portion 12 to display the watermark selected in the pull-down menu 91 on a preview screen 92. Further, like the scroll bar 66 or 67 explained in FIG. 6, when a user operates a scroll bar 93 or 94 shown in FIG. 8 by a mouse or the like, the setting acceptance portion 15a changes a position of characters of the watermark in the vertical or horizontal directions according to the operation.

Further, like the scroll bar 69 or 70 explained in FIG. 6, when a user operates a scroll bar 95 or 96 shown in FIG. 8 by a mouse or the like, the setting acceptance portion 15a changes a size or an angle of the characters.

Further, the setting acceptance portion 15a controls the display portion 12 to display a radio button 97 for accepting selection from a user of whether only a watermark in a native language (Japanese in the present embodiment) is displayed, whether only a watermark in a specified language (other language) is displayed, or whether those in both the native language and the specified language are displayed on the language conversion setting screen 90.

Further, the setting acceptance portion 15a controls the display portion 12 to display a pull-down menu 98 for accepting setting of a language after conversion of the watermark on the language conversion setting screen 90. When the user clicks the pull-down menu 98 by a mouse or the like, the setting acceptance portion 15a displays on the display portion 12 items such as English, Korean, Chinese or Portuguese.

The setting acceptance portion 15a accepts from a user whether a language of a watermark is set only to a native language, only to a specified language, or to both the native language and the specified language. Then, when setting the language of the watermark only to the specified language, or to both the native language and the specified language, the setting acceptance portion 15a further accepts setting of a language by the user from the pull-down menu 98.

In FIG. 8, for example, when the radio button 97 of "native language only" is selected and English is selected in the pull-down menu 98, the setting acceptance portion 15a displays a watermark in English on the preview screen 92.

Figure 9:
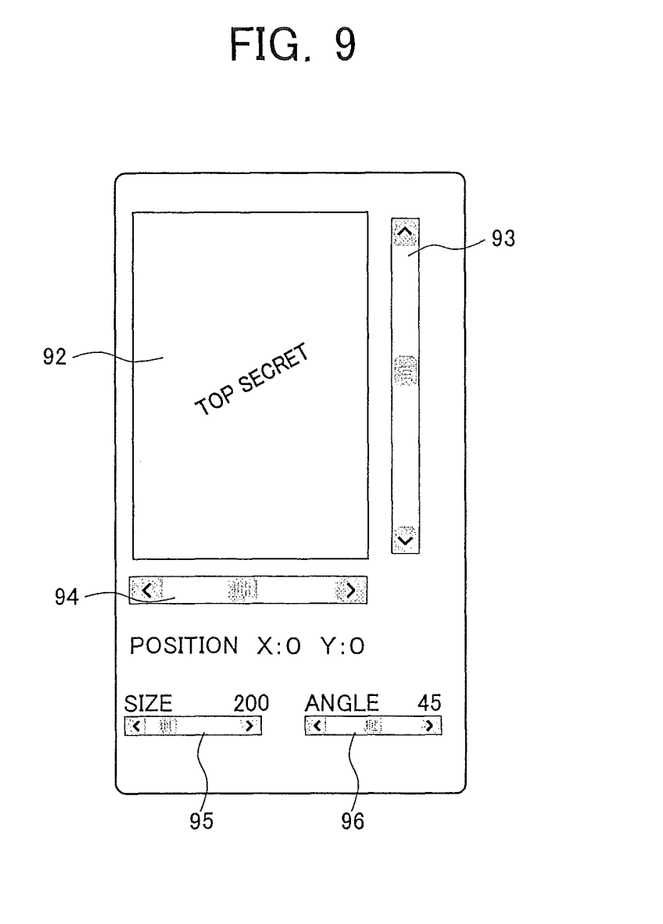
FIG. 9 is a diagram showing an example of a preview screen on which a watermark in English is displayed.

FIG. 9 is a diagram showing an example of the preview screen 92 on which a watermark in English is displayed. As shown in FIG. 9, the setting acceptance portion 15a controls the display portion 12 to display on the preview screen 92 characters, "TOP SECRET", which is a translation of characters of "極秘 (TOP SECRET)" in Japanese as a watermark. Thereby, a local staff member who receives a document including the watermark can recognize the importance of the document and the security of the document can be secured.

In addition, when the characters of the watermark in Japanese are "至急 (URGENT)", "大至急 (TOP URGENT)", "マル秘 (CONFIDENTIAL)", "重要 (IMPORTANT)", and "コピー厳禁 (NON COPY)", the setting acceptance portion 15a controls the display portion 12 to display characters of "URGENT", "TOP URGENT", "CONFIDENTIAL", "IMPORTANT", and "NON COPY", respectively.

Further, when the user selects a radio button 97 of "in both native language/specified language" and selects English in the pull-down menu 98 in FIG. 8, the setting acceptance portion 15a controls the display portion 12 to display on the preview screen 92 watermarks in Japanese as a native language and in English.

Figure 10:
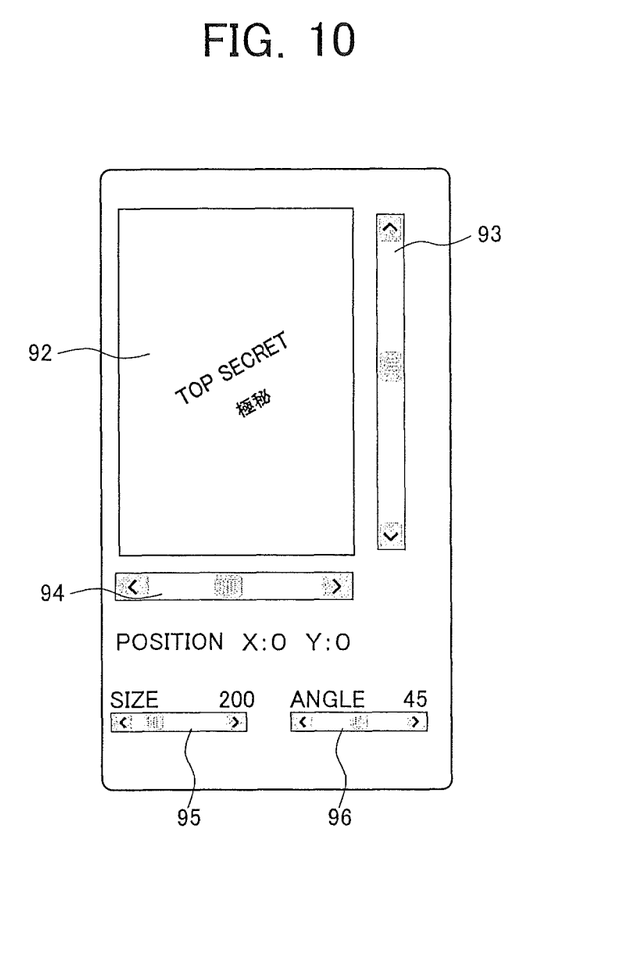
FIG. 10 is a diagram showing an example of a preview screen on which watermarks in English and Japanese are displayed.

FIG. 10 is a diagram showing an example of the preview screen 92 on which watermarks in English and Japanese are displayed. As shown in FIG. 10, the setting acceptance portion 15a controls the display portion 12 to display on the preview screen 92 characters in Japanese of "極秘 (TOP SECRET)" and a translation thereof, characters of "TOP SECRET" as a watermark. Thereby, not only a creator of a document but also a local staff member and a local Japanese staff member can recognize importance of the document and the security of the document can be secured.

Returning to the description of FIG. 8, the setting acceptance portion 15a controls the display portion 12 to display on the language conversion setting screen 90 in FIG. 8 two spin buttons 99 and 100. The spin button 99 is a button for accepting from a user, in the case of displaying the characters of the watermark in both the native language (Japanese in the present embodiment) and the specified language (English in the present embodiment), setting of a display magnification of the characters in the specified language relative to the characters in the native language. The display magnification is set to a value which is 100% or more, and as a result, characters in the specified language are displayed in a font size larger than that of the characters in the native language.

Figure 11:
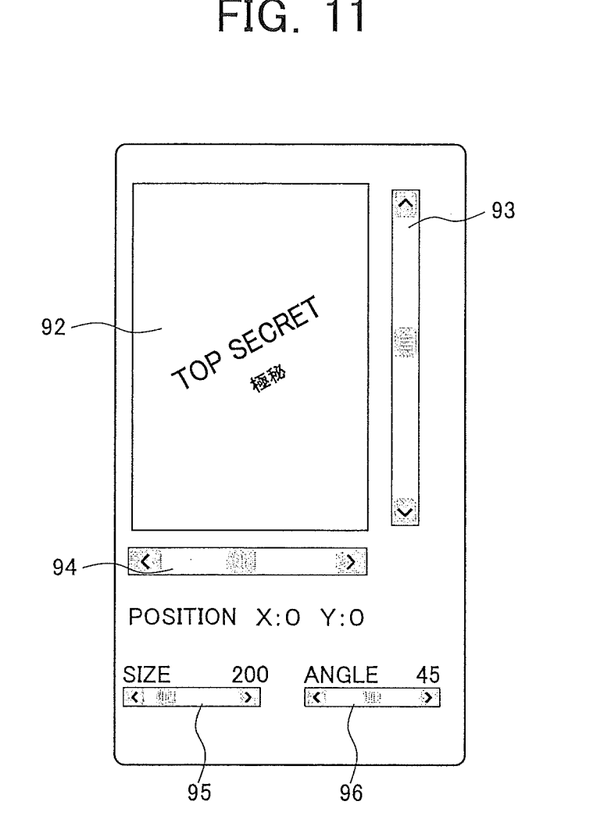
FIG. 11 is a diagram showing an example of characters in a specified language which are displayed in a font size larger than that of characters in a native language.

FIG. 11 is a diagram showing an example of characters in a specified language which are displayed in a font size larger than that of characters in a native language. For example, as shown in FIG. 8, when a user uses the spin button 99 to set to "120%", the setting acceptance portion 15a controls the display portion 12 to display characters in English which is a specified language in a font size "120%" larger than a font size of characters in Japanese which is a native language. Thereby, it is possible to prevent from overlooking the watermark by a local staff member and security of a document can be secured more reliably.

Further, when the user operates with a mouse or the like the scroll bars 95 and 96 in FIG. 11, the setting acceptance portion 15a reduces or enlarges a size as well as changing an angle of characters in a native language or characters in a specified language with respect to an entire sheet while holding a ratio of a font size between the characters in the native language and the characters in the specified language shown in FIG. 11.

Going back to the explanation of FIG. 8, the spin button 100 shown in FIG. 8 is a button for accepting setting of a display density of characters of a watermark. When a user changes setting of a display density using the spin button 100, the setting acceptance portion 15a changes the display density of the watermark according to the setting.

Figure 12:
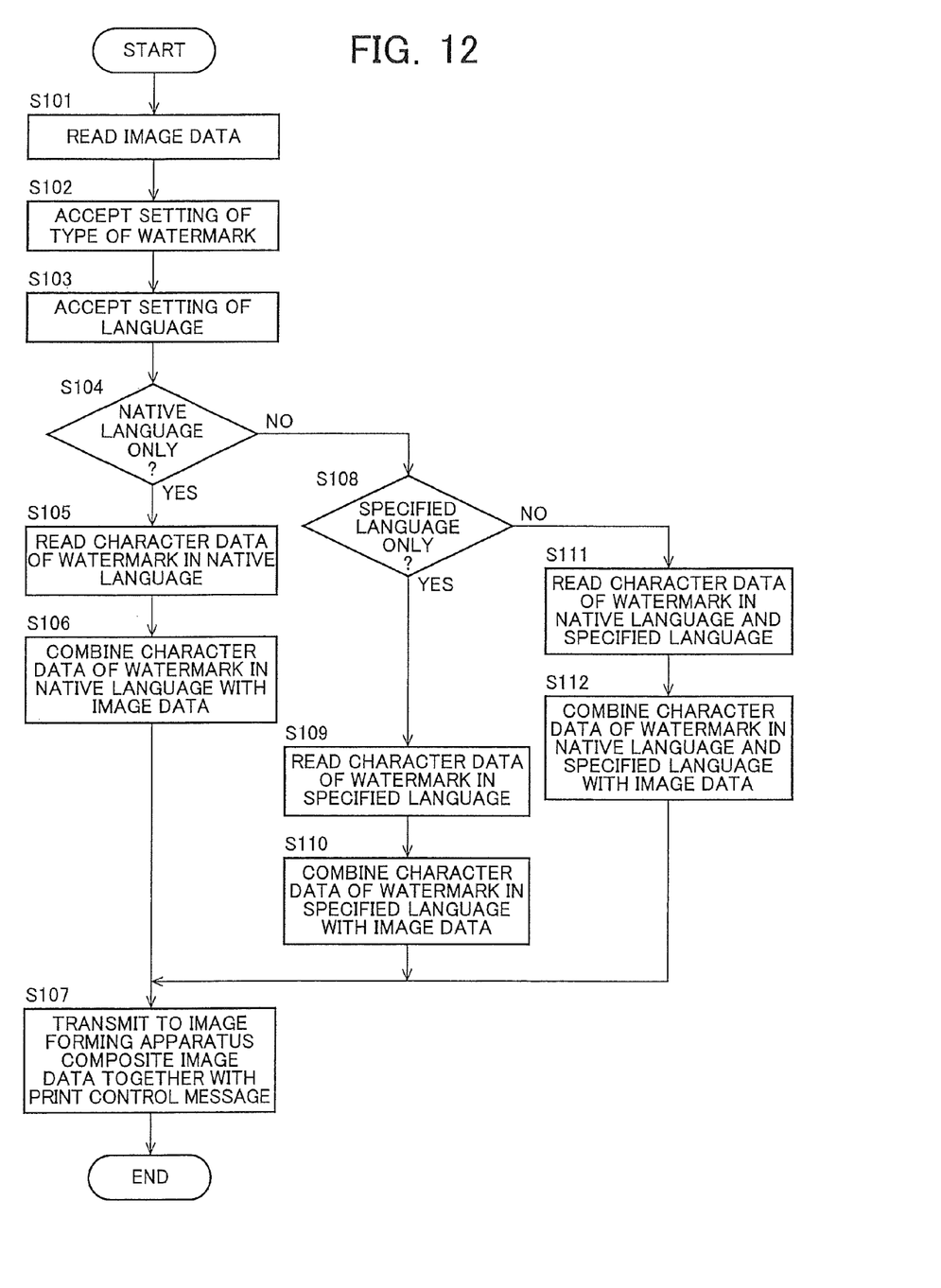
FIG. 12 is a flowchart showing an example of processing procedure of apparatus control processing performed by the control device.

Next, description will be given for processing procedure of apparatus control processing performed by the control apparatus 10. FIG. 12 is a flowchart showing an example of processing procedure of the apparatus control processing performed by the control apparatus 10.

First, the setting acceptance portion 15a of the control apparatus 10 accepts specification of the image data 14c to be printed from a user and reads the image data 14c from the storage portion 14 (step S101).

The setting acceptance portion 15a then accepts setting of a type of a watermark from the user with the pull-down menu 61 shown in FIG. 4 (step S102), and further accepts setting of a language made by the user using the radio button 97 or the pull-down menu 98 shown in FIG. 8 (step S103).

The data generating portion 15b then determines whether or not the user selected "native language only" using the radio button 97 shown in FIG. 8 (step S104). When the user selects "native language only" (in the case of YES at step S104), the data generating portion 15b reads character data of the watermark in the native language from the character data 14b (step S105).

The data generating portion 15b then combines the character data of the watermark in the native language with the image data 14c read at step S101 to generate the composite image data 14d (step S106).

Thereafter, the apparatus control portion 15c transmits the composite image data 14d to the image forming apparatus 20 and also transmits a print control message instructing to print the composite image data 14d to the image forming apparatus 20 (step S107), and the apparatus control processing is finished. The image forming apparatus 20 which received the print control message performs processing to print the composite image data 14d.

When the user did not select "native language only" at step S104 (in the case of NO at step S104), the data generating portion 15b determines whether or not the user selected "specified language only" using the radio button (step S108).

When the user selected "specified language only" (in the case of YES at step S108), the data generating portion 15b reads character data of the watermark in the language specified by the user from the character data 14b using the pull-down menu 98 shown in FIG. 8 (step S109).

The data generating portion 15b then combines the character data of the watermark in the specified language with the image data 14c read at step S101 to generate the composite image data 14d (step S110).

Thereafter, the apparatus control portion 15c transmits the composite image data 14d to the image forming apparatus 20 and also transmits a print control message instructing to print the composite image data 14d to the image forming apparatus 20 (step S107), and the apparatus control processing is finished. The image forming apparatus 20 which received the print control message performs processing to print the composite image data 14d.

When the user did not select "specified language only" at step S108 (in the case of NO at step S108), it means that the user selected the radio button 97 of "write in both native language/specified language" shown in FIG. 8, and the data generating portion 15b thus reads, in addition to the character data of the watermark in the native language, character data of the watermark in the language specified by the user from the character data 14b using the pull-down menu 98 shown in FIG. 8 (step S111).

The data generating portion 15b then combines the character data of the watermark in the native language and the character data of the watermark in the specified language with the image data 14c read at step S101 to generate the composite image data 14d (step S112).

Thereafter, the apparatus control portion 15c transmits the composite image data 14d to the image forming apparatus 20 and also transmits a print control message instructing to print the composite image data 14d to the image forming apparatus 20 (step S107), and the apparatus control processing is finished. The image forming apparatus 20 which received the print control message performs processing to print the composite image data 14d.

Note that, the above-described apparatus control processing is configured to accept setting of a type of a watermark with the pull-down menu 61 shown in FIG. 4 from a user, further receive setting of a language made by a user using the radio button 97 or the pull-down menu 98 shown in FIG. 8, and read character data of a watermark corresponding to the type and the language, however, may be configured that, when input of characters is performed by a user in the text input field 62 shown in FIG. 4, the setting acceptance portion 15a translate the characters using dictionary data and sets the translated character data as character data to be combined with the image data 14c as a watermark.

Here, the above-described dictionary data is data in which a word in a native language associated with a translated word that is a translation of the word in the native language into another language are stored, and the dictionary data is assumed to be stored in the storage portion 14 in advance. Thereby, it is allowed for a user to input, when there is no watermark found in desired characters in the pull-down menu 61, the characters in the text input field 62 and thereby use the watermark in the characters.

Although the embodiments of the apparatus control method and the control apparatus have been mainly described so far, the present invention is not limited to these embodiments and the present invention may be implemented as a form of a computer program which realizes functions of the control apparatus or a form of a computer readable recording medium having the computer program recorded therein.

Here, the recording medium may employ various forms of a disk type (for example, such as a magnetic disk and an optical disk), a card type (for example, such as a memory card and an optical card), a semiconductor memory type (for example, such as a ROM and a non-volatile memory), a tape type (for example, such as a magnetic tape and a cassette tape) and the like.

Reduction of costs and improvement in portability or versatility are able to be improved by distributing the recording medium having a computer program which realizes the functions of the control apparatus in the above embodiments or a computer program which causes a computer to execute the apparatus control method recorded therein.

The above recording medium is then mounted to a computer, a computer program recorded in the recording medium is read out by the computer to be stored in a memory, and the computer program is read out from the memory by a processor (CPU: Central Processing Unit, MPU: Micro Processing Unit) provided in the computer for execution, so that it is possible to realize the functions of the control apparatus according to these embodiments and execute the apparatus control method.

Moreover, the present invention is not limited to the above embodiments and may variously be modified and altered within a range without departing from the spirit of the present invention.

For example, in the above embodiments, as description has been given using FIG. 8, in the case of converting a language of a watermark, the language after conversion is set by accepting specification of the language from a user in the pull-down menu 98, however, it may be configured that specification of a country name which is a destination of a composite image obtained by printing composite image data is accepted from the user, and setting of the language after conversion is made based on the country name.

In this case, the setting acceptance portion 15a, for example, controls the display portion 12 to display on the language conversion setting screen 90 shown in FIG. 8 a pull-down menu for accepting from a user selection of a destination country of a composite image. Additionally, in the storage portion 14, language information is stored which stores information of a country name and an official language used in the country associated with each other.

The setting acceptance portion 15a then refers to, when a user selects a country name from the pull-down menu by operating a mouse or the like, the language information and sets an official language corresponding to the country name to a language after conversion when converting the language of the watermark. Note that, here, it is assumed that the official language is used, however, not limited thereto, and it may be configured that an arbitrary language may be used by being associated with a country name.

Figure 13:
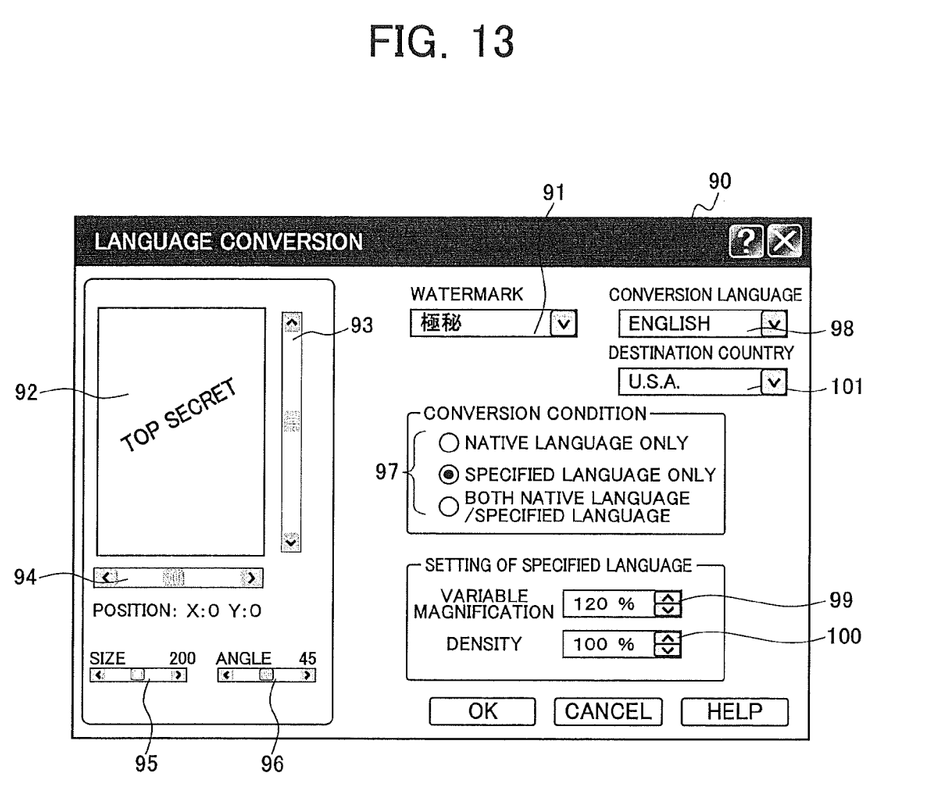
FIG. 13 is a diagram showing an example of the language conversion setting screen which accepts selection of a destination country name.

FIG. 13 is a diagram showing an example of the language conversion setting screen 90 which accepts selection of a destination country name. On the language conversion setting screen 90, a pull-down menu 101 is displayed for accepting selection of a country which is a destination of a composite image from a user.

When a destination country name (U.S.A. in the example of FIG. 13) is selected in the pull-down menu 101, the setting acceptance portion 15a refers to the language information described above and controls the display portion 12 to display a language corresponding to the destination country name (English in the example of FIG. 13) in the pull-down menu 98. The setting acceptance portion 15a further controls the display portion 12 to display on the preview screen 92 the watermark written in English. In this way, the setting acceptance portion 15a accepts from a user the setting of the language after conversion when converting the language of the watermark.

Thereby, even when it is unknown which language is used in a destination country of a composite image, a user is capable of adding an appropriate watermark to a document by only selecting a destination country, so as to make a local staff member receiving the document to be able to recognize the importance of the document without fail.

Hereinabove, according to the present invention, setting of a first language describing first characters indicated by first character data, and setting of second characters which are a translation of the first characters to a second language are accepted from a user; the first character data indicating the first characters which are a translation of the second characters to the first language is read from a storage portion; composite image data in which image data is combined with the first character data is generated; the composite image data is transmitted to the image forming apparatus and the image forming apparatus is controlled to cause the image forming apparatus to execute image forming processing of the composite image data, so that a user is able to appropriately select character data such as a watermark to be combined with a document before performing image formation, and importance of the document is able to be effectively recognized by an addressee using a language which is different from that of the user who sends the document.

The invention claimed is:

1. An apparatus control method for controlling an image forming apparatus which generates composite image data in which image data is combined with first character data and performs image formation of the composite image data, comprising:
    a setting receiving step of accepting from a user setting of a first language describing a first character indicated by the first character data, and setting of a second character which is a translation of the first character to a second language;
    a data reading step of reading from a storage portion the first character data indicating the first character which is a translation of the second character to the first language;
    a data generating step of generating the composite image data in which the image data is combined with the first character data; and
    a control step of transmitting the composite image data to the image forming apparatus and controlling the image forming apparatus to execute image forming processing of the composite image data,
    wherein, in the setting receiving step, upon accepting a selection of a destination country of the composite image data by the user, the first language is set by referring to language information of the destination and setting the first language based on a correspondence between the destination country and a language used in the destination country.

2. The apparatus control method as defined in claim 1, generating, at the data generating step, a composite image data which further combines, in addition to the first character data, second character data indicating the second character with the image data.

3. The apparatus control method as defined in claim 2, generating, at the data generating step, the composite image data in which a size of the first character is displayed larger than a size of the second character.

4. The apparatus control method as defined in claim 1, further comprising a display step of displaying on a display portion a preview of the composite image data generated at the data generating step.

5. A control apparatus for controlling an image forming apparatus which generates composite image data in which image data is combined with first character data and performs image formation of the composite image data, comprising:
    a storage portion for storing the first character data;
    a setting accepting portion for accepting from a user setting of a first language describing a first character indicated by the first character data, and setting of a second character which is a translation of the first character into a second language;
    a data generating portion for reading from the storage portion the first character data indicating the first character which is a translation of the second character of the first language, and generating the composite image data in which the image data is combined with the first character data; and
    an apparatus control portion for transmitting the composite image to the image forming apparatus and controlling the image forming apparatus to execute image forming processing of the composite image data,
    wherein, the setting accepting portion accepts selection of a destination country of the composite image data by the user, refers to language information of the destination country, and sets the first language based on a correspondence between the destination country and a language used in the destination country.

* * * * *